United States Patent
Isano

[11] Patent Number: 6,076,878
[45] Date of Patent: Jun. 20, 2000

[54] GLOVE BOX STRUCTURE

[75] Inventor: Makoto Isano, Hamamatsu, Japan

[73] Assignee: Suzuki Motor Corporation, Japan

[21] Appl. No.: 09/154,439

[22] Filed: Sep. 16, 1998

[30] Foreign Application Priority Data

Sep. 17, 1997 [JP] Japan .................................. 9-251521

[51] Int. Cl.⁷ .................................................. B60R 13/01
[52] U.S. Cl. .......................... 296/37.12; 296/37.8; 16/82; 16/85
[58] Field of Search ................. 296/37.12, 37.8; 16/82, 85

[56] References Cited

U.S. PATENT DOCUMENTS

| 2,980,945 | 4/1961 | Hollar, Jr. ................................. | 16/85 |
| 3,165,777 | 1/1965 | Peras ...................................... | 16/85 |
| 3,167,807 | 2/1965 | Schaad ................................... | 16/85 |
| 3,837,040 | 9/1974 | Keller et al. ............................. | 16/85 |
| 4,069,547 | 1/1978 | Guionie et al. ........................... | 16/85 |
| 4,239,277 | 12/1980 | Oda ..................................... | 296/37.12 |
| 5,385,378 | 1/1995 | Hakamada et al. ......................... | 16/82 |
| 5,388,880 | 2/1995 | Kinana ................................... | 296/37.8 |
| 5,558,385 | 9/1996 | Gross et al. .............................. | 296/37.12 |
| 5,845,954 | 12/1998 | DePue .................................. | 296/37.12 |
| 5,868,448 | 2/1999 | Izumo ................................... | 296/37.12 |

FOREIGN PATENT DOCUMENTS

| 3427296 | 9/1985 | Germany ............................. | 296/37.12 |
| 405085268 | 4/1993 | Japan ................................. | 296/37.12 |
| 405085269 | 4/1993 | Japan ................................. | 296/37.12 |

Primary Examiner—Joseph D. Pape
Assistant Examiner—Kiran Patel
Attorney, Agent, or Firm—McGlew & Tuttle, PC

[57] ABSTRACT

It is an object of the present invention to open a glove box in two stages with a simple structure. A stopper formed of an elastic member is fixed to side faces of the glove box. An inclined face is formed on a tip portion of the stopper. When the glove box is incorporated in the instrument panel and is opened, the inclined face is engaged with an opening edge portion incorporating the instrument panel so that the glove box is held in a half-opening position. Furthermore, when the glove box is rotated, a projection is controlled by the opening edge portion of the instrument panel so that the glove box is held in a full-opening state.

7 Claims, 10 Drawing Sheets

GLOVE BOX STRUCTURE

BACKGROUND OF THE INVENTION AND RELATED ART STATEMENT

1. Field of the Invention

The present invention relates to a glove box structure which is incorporated in an instrument panel of an automobile and which allows step-wise opening of a glove box in two stages.

2. Description of Related Art

Figure 11:
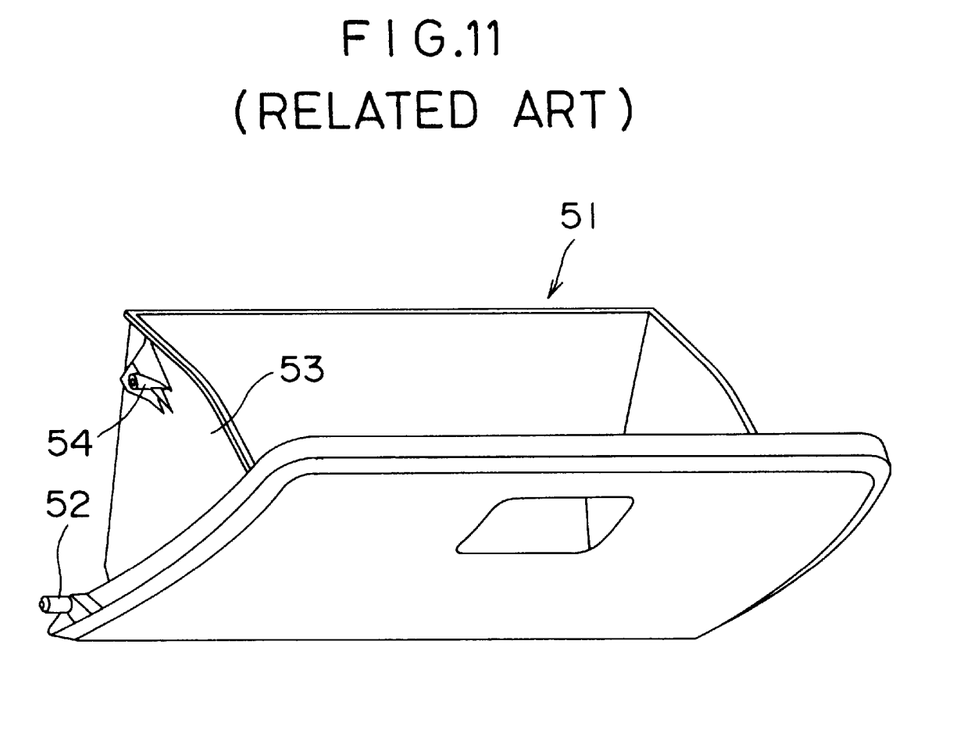
FIG. 11 is a perspective view showing a conventional glove box.

FIG. 11 shows a conventional glove box 51. The glove box 51 is incorporated in an instrument panel which is not shown. The whole glove box 51 can be rotated in a vertical direction for opening and closing around a hinge 52 which is a rotary shaft provided at a lower end of the glove box 51.

When the glove box 51 is opened to its full extent, an axial projection 54 provided on a side face 53 of the glove box 51 comes in contact with an opening edge portion of the instrument panel so that further rotation is controlled.

OBJECT AND SUMMARY OF THE INVENTION

The above-mentioned glove box has a structure in which it is opened at a stretch until the projection hits the opening edge portion of the instrument panel. In particular, if the glove box is placed before a passenger's knee position and the glove box lid may hit his knee, the passenger has to withdraw his knee inconveniently. In most cases, articles can be taken out of the glove box with the glove box half-opened.

In consideration of the above-mentioned problems, it is an object of the present invention to provide a glove box structure capable of once engaging a glove box at an arbitrary position with the glove box half-opened and of opening the glove box to its full extent if necessary.

In order to attain the above-mentioned object, the present invention provides a glove box structure comprising a glove box provided in an opening formed on an instrument panel of an automobile, a rotary shaft provided in the glove box for rotatably supporting the glove box on the instrument panel, and a control member for controlling a maximum rotational position when the glove box is to be opened, wherein an engagement member having an inclined face to be engaged with an opening edge portion of the instrument panel is provided on side faces of the glove box, and the engagement member is engaged at an arbitrary position between the closed state of the glove box and the maximum rotational position to open the glove box.

DETAILED DESCRIPTION OF PREFERRED EMBODIMENTS

A glove box structure according to an embodiment of the present invention will be described below with reference to the drawings.

Figure 1:
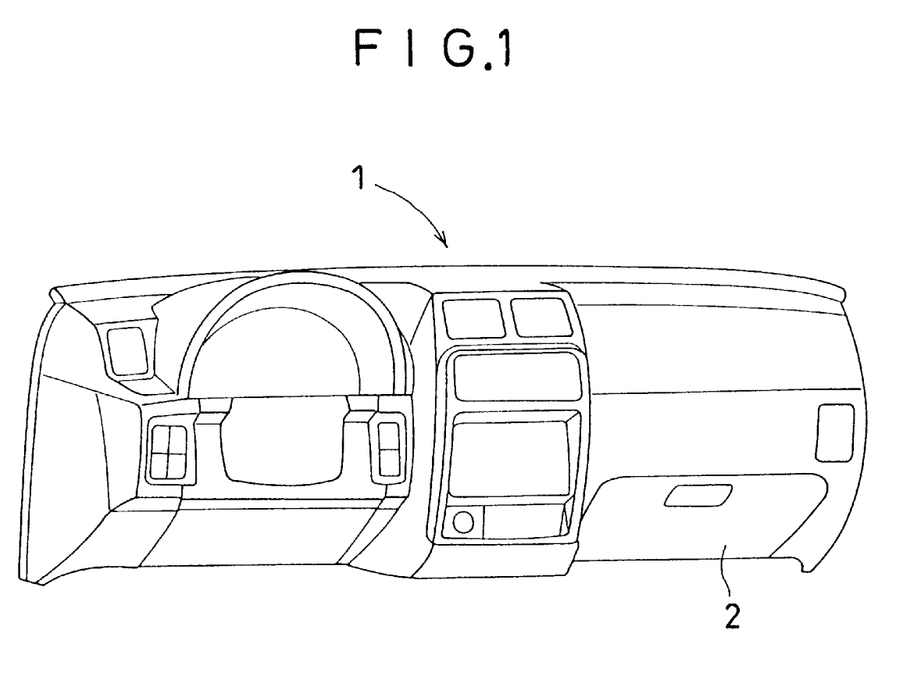
FIG. 1 is a perspective view showing an instrument panel which employs a glove box structure according to an embodiment of the present invention.

FIG. 1 shows an instrument panel 1 of an automobile wherein a glove box 2 to be opened and closed in the up and down direction is provided in a position just before a passenger's knee at a lower portion of the panel on the assistant driver's seat side on the right side (the automobile is of a left-handle drive type).

Figure 2:
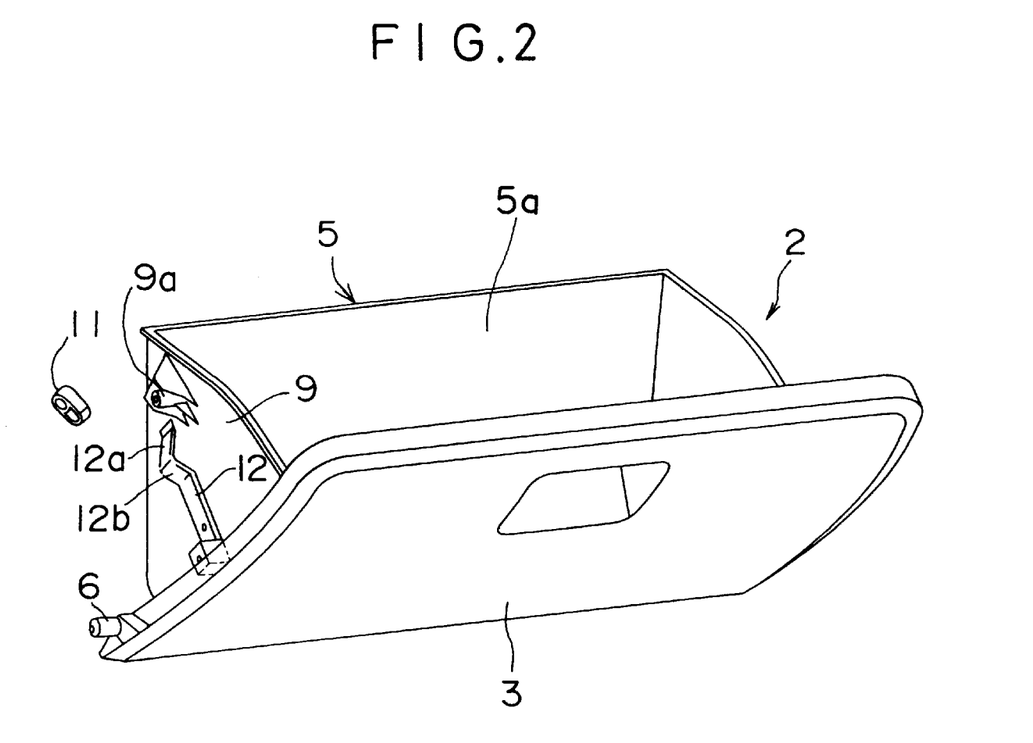
FIG. 2 is a perspective view showing a glove box of FIG. 1.
Figure 3:
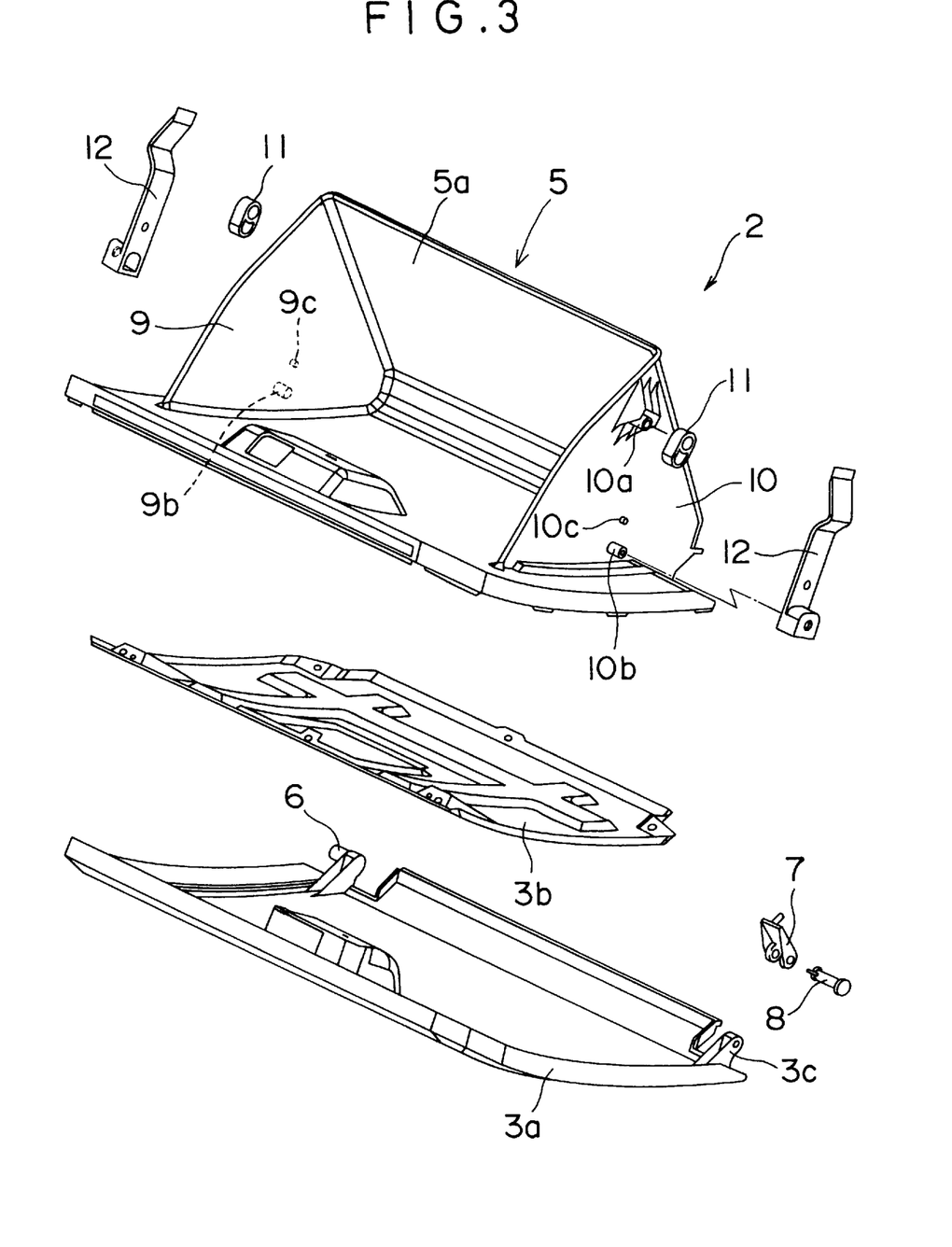
FIG. 3 is an exploded perspective view showing the glove box of FIG. 1.

FIGS. 2 and 3 are enlarged views showing the glove box 2. The glove box 2 has a lid 3 provided toward the vehicle compartment. The lid 3 includes a surface panel 3a and a reinforcing panel 3b provided on the back side of the surface panel 3a. A box 5 is provided on the back side of the lid 3. The box 5 has an opening 5a formed for placing and taking small articles in and out of the box.

Each side face 9 or 10 of the box 5 is almost triangular and gradually narrowed from the opening 5a toward a lower portion. These side faces form one apex of the triangle at a lower end of the lid 3.

A hinge shaft 6 protruding in a transverse direction of the car body is provided at a left lower end of the lid 3. The hinge shaft 6 is fitted in a supporting hole (not shown) of the instrument panel 1 and is rotatably supported. A hinge arm 3c is provided on a right lower end of the lid 3, and is held by a supporting member 7 fixed onto the instrument panel 1. A hinge pin 8 is inserted into holes formed on the supporting member 7 and the hinge arm 3c. Consequently, when the glove box 2 is fixed to the instrument panel 1, it can be rotatably opened and closed upward.

Figure 5:
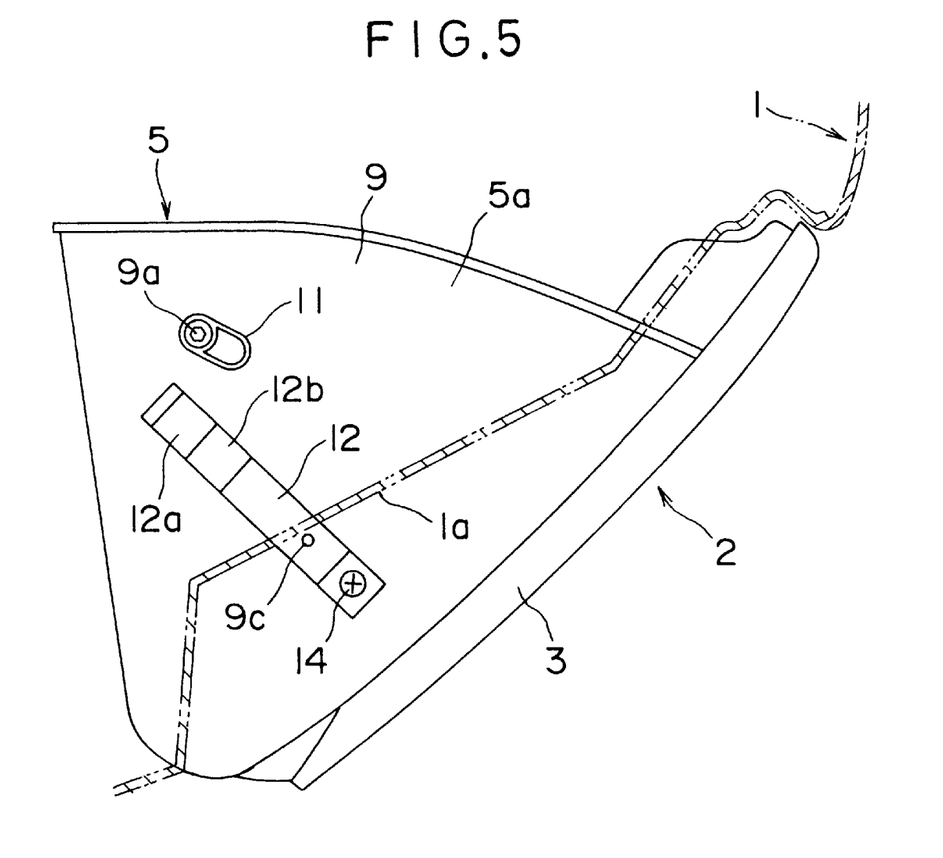
FIG. 5 is a sectional view showing a state in which the glove box of FIG. 1 is closed.
Figure 6:
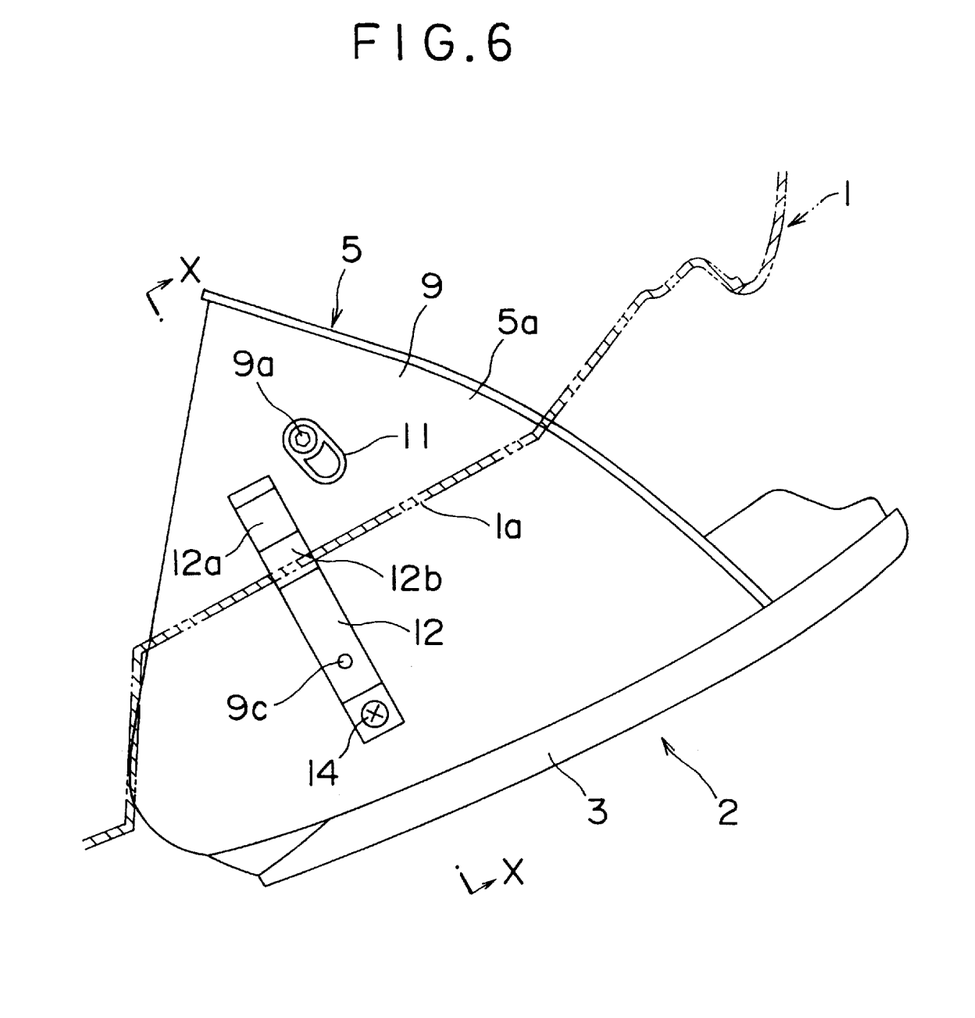
FIG. 6 is a sectional view showing a state in which the glove box of FIG. 1 is half-opened.
Figure 7:
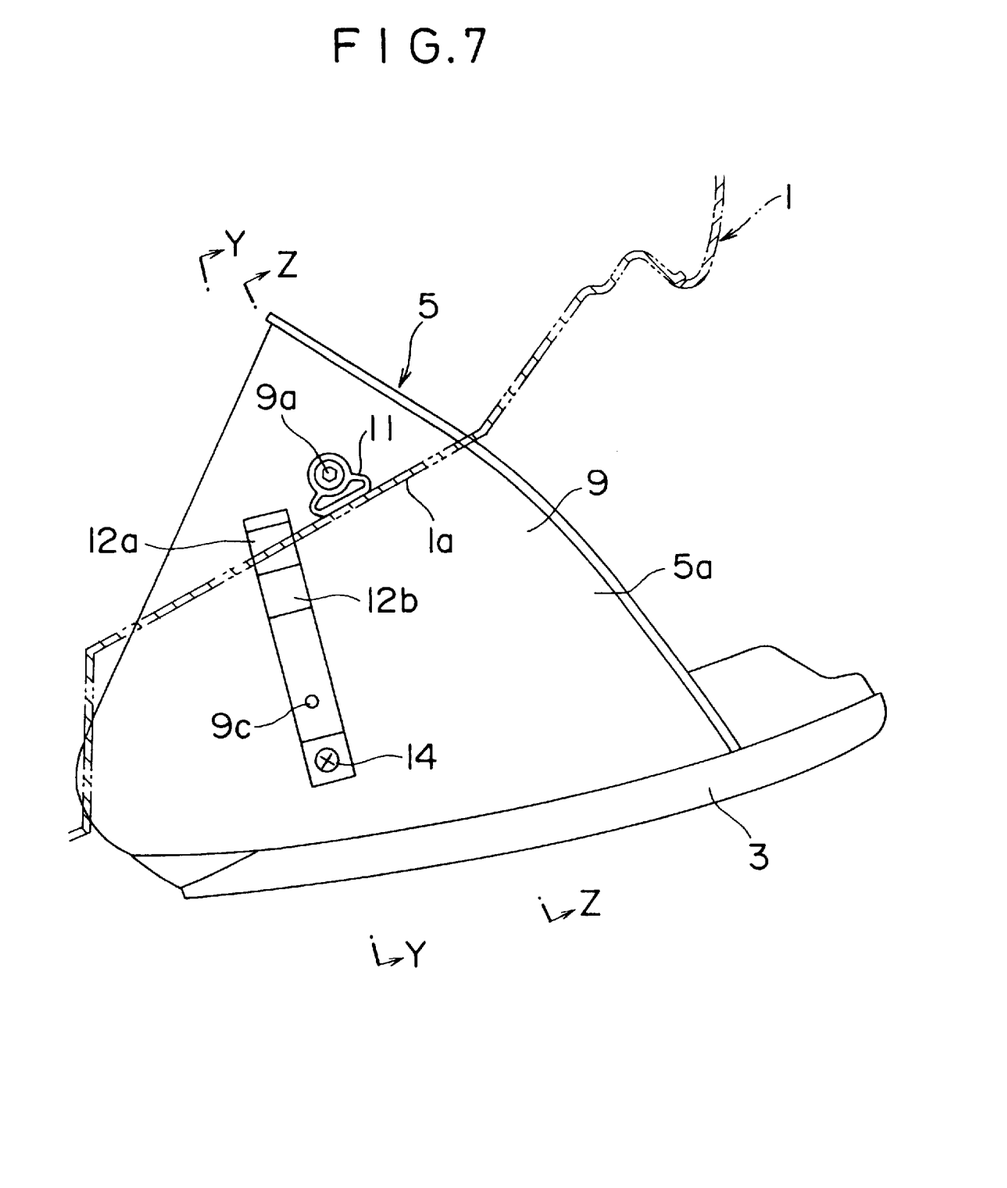
FIG. 7 is a sectional view showing a state in which the glove box of FIG. 1 is opened to its full width.

The left and right side faces 9 and 10 of the glove box 2 are provided with control members or axial projections 9a and 10a for controlling a maximum rotational position of the glove box 2, respectively. These projections 9a and 10a have a convex shape, extending or projecting in a transverse direction of the car body. A cushion 11 formed of an elastic member such as rubber which is shown in FIGS. 5 to 7 is attached to each of the projections 9a and 10a.

Figure 4:
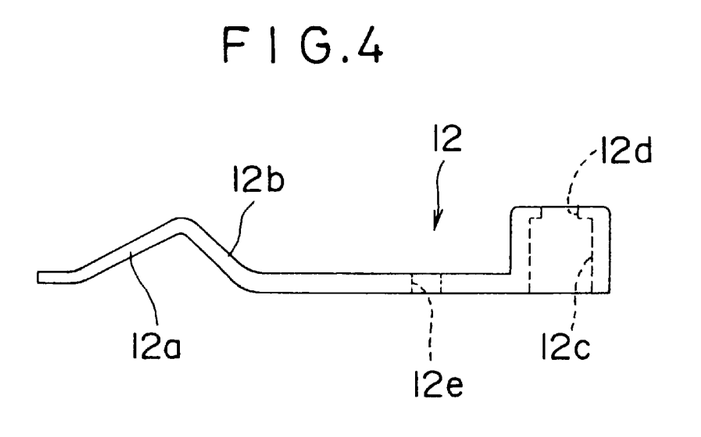
FIG. 4 is a side view showing a stopper fixed to side faces of the glove box according to the embodiment of the present invention.

Furthermore, an engagement member or a stopper 12 shown in FIG. 4 is fixed to the left and right side faces 9 and 10 of the glove box 2. The stopper 12 is made of polyoxymethylene having sufficient elasticity, and has a boss inserting hole 12c acting as a fixing portion formed on the rear end side and has a screw inserting hole 12d formed over the boss inserting hole 12c. A positioning hole 12e is formed a little to the center of the stopper 12 from the screw inserting hole 12d.

The other end side of the stopper 12 is bent in a dogleg shape, and has a forward inclined face 12a provided on the tip side and has a backward inclined face 12b provided adjacent to the forward inclined face 12a. The forward inclined face 12a is inclined in the width direction of the car body from a front portion of the car body toward a rear portion thereof, and the backward inclined face 12b is inclined in the width direction of the car body from the rear portion of the car body toward the front portion thereof.

Figure 8:
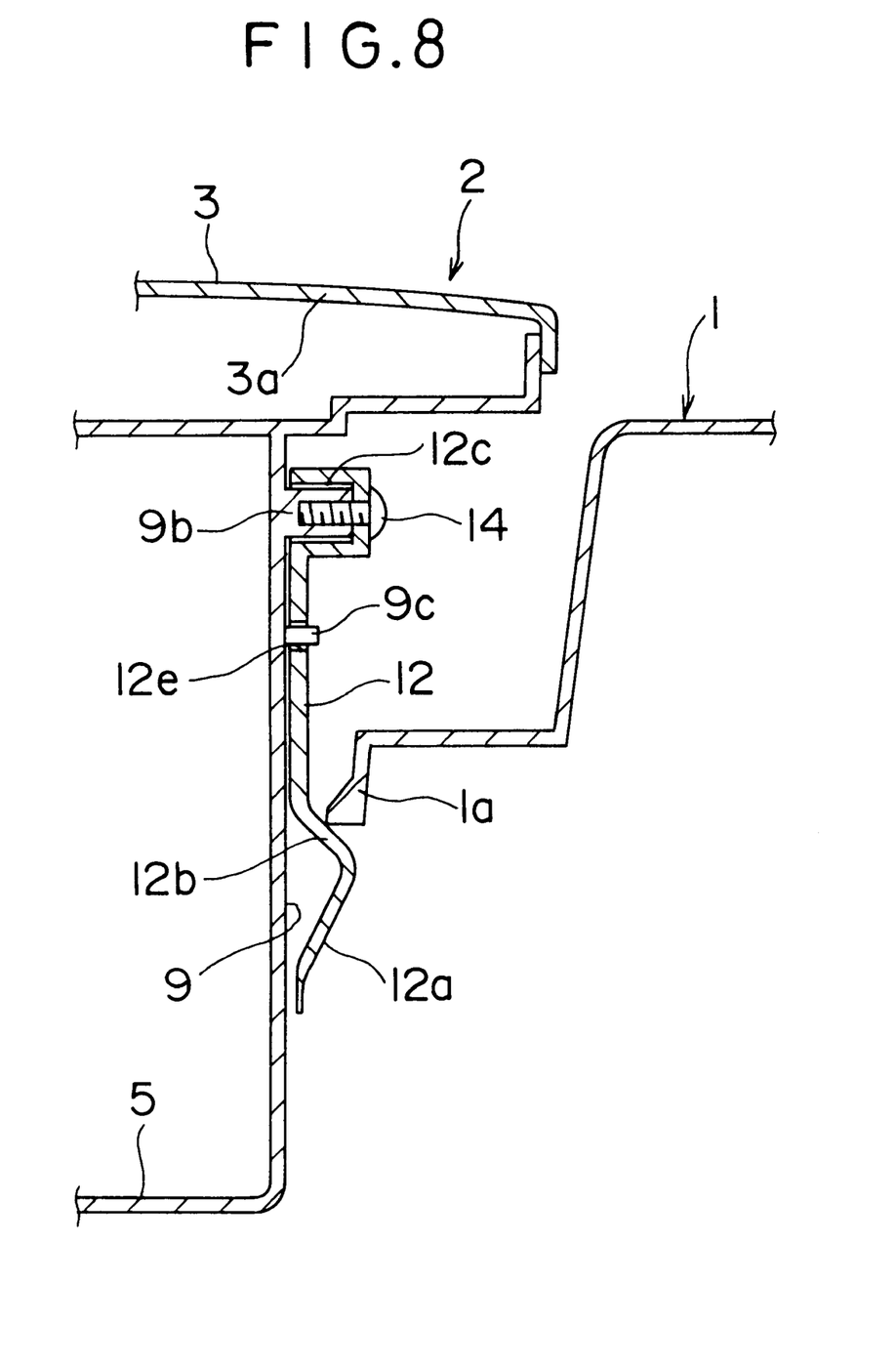
FIG. 8 is a sectional view taken along the line X—X in FIG. 6.
Figure 9:
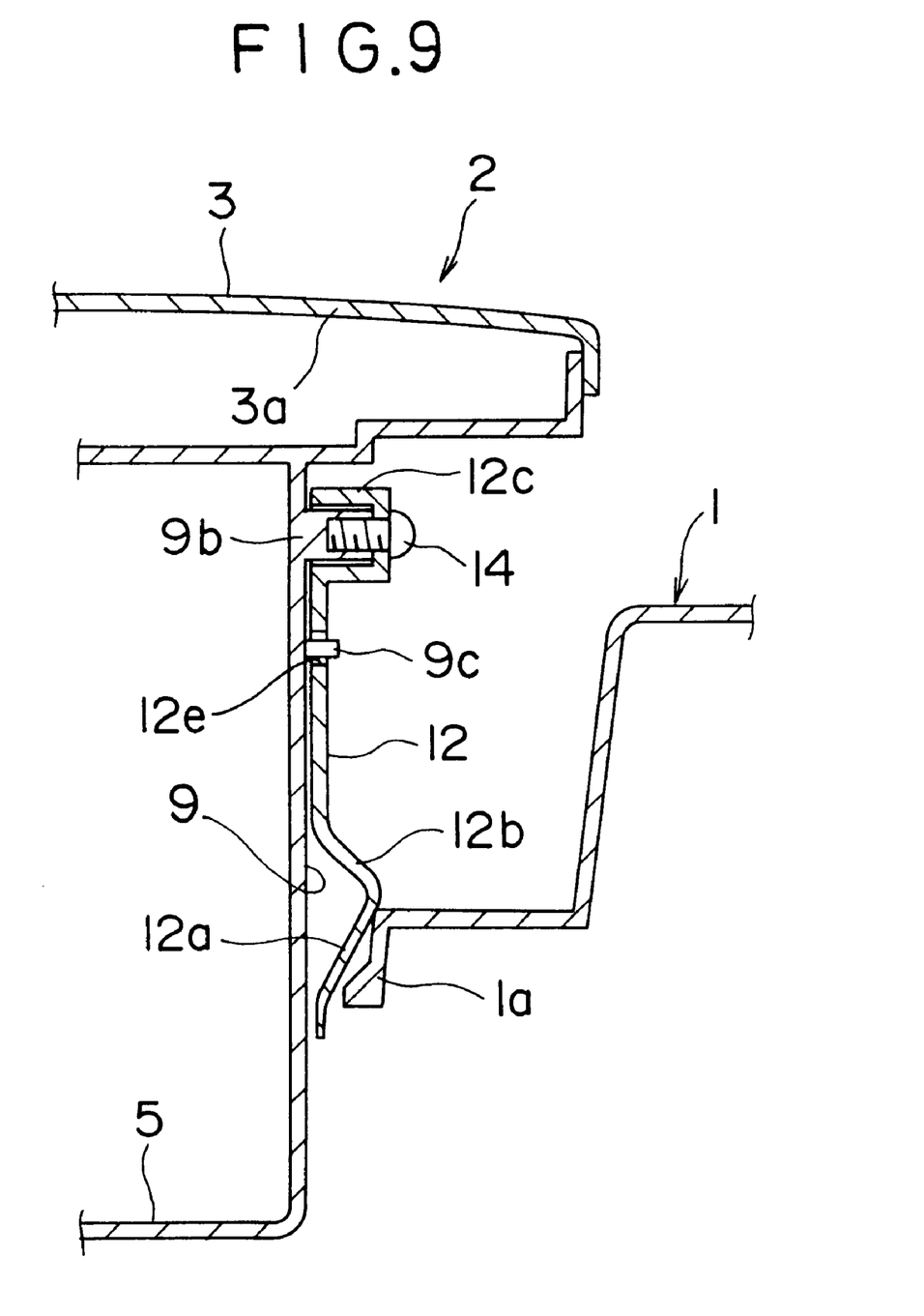
FIG. 9 is a sectional view taken along the line Y—Y in FIG. 7.

As shown in FIGS. 8 and 9, the left and right side faces 9 and 10 of the glove box 2 (only the left side face is shown in the drawings) are provided with boss portions 9b and 10b for fixing the stopper 12 and projections 9c and 10c for positioning the stopper 12, respectively. The boss portions 9b and 10b and the projections 9c and 10c are fitted in the boss inserting holes 12c and the positioning holes 12e respectively and the stopper 12 is fixed with a screw 14. As shown, a clearance is formed between a stopper 12 face and each of the left and right side faces 9 and 10 with the stopper 12 fixed.

A positional relationship between the inclined faces 12a and 12b and the projections 9a and 10a is as follows. When the glove box 2 is in the closed position its rotation angle is set to 0 degree as shown in FIG. 5 for the purpose of discussions below. The backward inclined face 12b, the forward inclined face 12a and the projections 9a and 10a are placed in this order according to a rotation angle.

While the constitution of the glove box structure according to the embodiment of the present invention has been described above, action thereof will be described below.

FIG. 5 shows the glove box 2 as it is in the closed position. In this position, the stopper 12 fixed to each of the left and right side faces 9 and 10 of the glove box 2 is by no means engaged with the opening edge portion 1a on the instrument panel 1.

When lock means (not shown) of the glove box 2 is released to open the glove box 2 as shown in FIG. 6, the glove box 2 is once engaged in a half-opening position just before the glove box 2 is opened to its full extent. As shown in FIG. 8, the opening edge portion 1a of the instrument panel 1 comes in contact with each of the left and right backward inclined faces 12b formed on the stoppers 12 so that the rotation of the glove box 2 is controlled. In this state, the glove box 2 is half-opened. Therefore, the glove box 2 itself does not particularly protrude from an instrument panel 1 face. Accordingly, the knees of a passenger taking an assistant driver's seat do not obstruct the lid of the glove box 2. Thus, small articles and the like can be taken out of the opening of the glove box 2.

When the glove box 2 is to be used in a full-opening state if necessary, the opening edge portion 1a of the instrument panel 1 goes over the backward inclined face 12b of the stopper 12 as shown in FIG. 9 as the glove box 2 is pulled toward the rear side of the car body.

In this case, since a clearance is provided between the stopper 12 and each of the side faces 9 and 10 of the glove box 2, a tip portion of the stopper 12 bends toward the side faces 9 and 10. In addition, since the stopper 12 is elastic, each of the inclined faces 12a and 12b is deformed to be fairly flat. Furthermore, since the top of the inclined faces 12a and 12b is rounded off, the opening edge portion 1a can easily go over onto the backward inclined face 12b.

Figure 10:
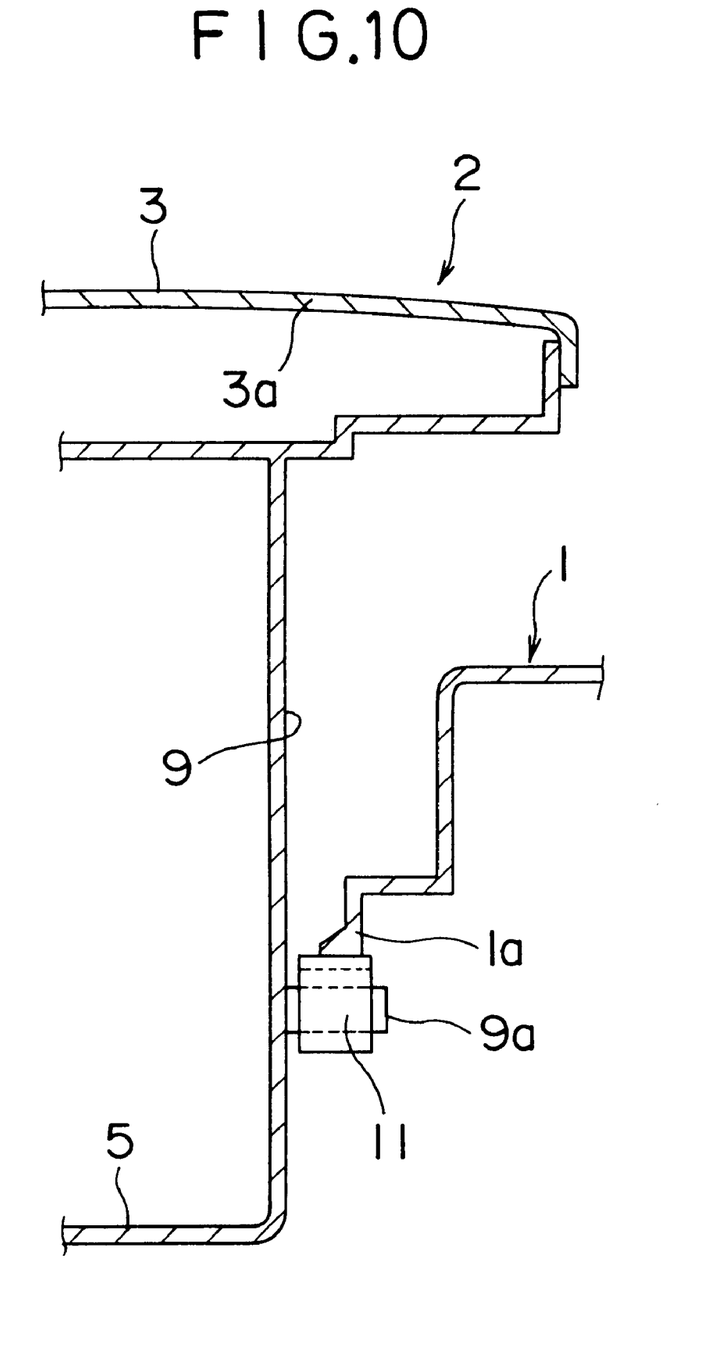
FIG. 10 is a sectional view taken along the line Z—Z in FIG. 7.

The opening edge portion 1a is disengaged from the stopper 12 so that each of the projections 9a and 10a provided on the side faces 9 and 10 of the glove box 2 comes in contact with the opening edge portion 1a through the cushion 11 as shown in FIG. 10. Consequently, further rotation of the glove box 2 is controlled.

When the glove box 2 is to be closed, it is pushed into the instrument panel 1. In this case, the opening edge portion 1a can smoothly go over the inclined face 12a portion because the forward inclined face 12a has been formed.

While the embodiment of the present invention has been described above, it is a matter of course that the present invention is not restricted thereto but can be variously changed and modified in accordance with technological thought of the present invention.

For example, while the stopper 12 has been fixed to the left and right side faces 9 and 10 of the glove box 2 in the above-mentioned embodiment, the above-mentioned two-stage opening and closing function can be obtained even if the stopper 12 is fixed to only one side.

Although polyoxymethylene having elasticity has been used as a material of the stopper 12, other elastic resins may be used and a material which is made of metal and has the shape of a leaf spring may be used. While a clearance has been provided between the stopper 12 and each of the side faces 9 and 10 of the glove box 2, the clearance may be omitted to disengage the stopper 12 from the opening edge portion 1a by only the elastic force of the stopper 12.

According to the present invention described above, the engagement member having the inclined faces to be engaged with the opening edge portion of the instrument panel has been provided at an arbitrary position on the side faces 9 and 10 of the glove box. Therefore, the glove box can be engaged with the inclined face and can be held at this arbitrary position. Accordingly, things can be taken in and out with the glove box half-opened. Therefore, when the glove box is to be opened, it is possible to prevent the glove box from touching a passenger's knee.

By shifting the position of the inclined face, the condition of the half-opening state can optionally be varied. By changing an inclination of the inclined face, the feeling and extent of hitching of the glove box can be adjusted.

Furthermore, the stopper is fixed to the side faces of the glove box. Therefore, the burden of a weight is not imposed, cost can be reduced and assembly can easily be performed.

What is claimed is:

1. A glove box structure comprising:
    a glove box provided in an opening formed on an instrument panel of an automobile, the glove box having side faces,
    a rotary shaft provided in the glove box for rotatably supporting the glove box on the instrument panel,
    a control member for controlling a maximum rotational position when the glove box is to be opened, and
    an engagement member having an inclined face to be engaged with an opening edge portion of the instrument panel, which engagement member is provided on one of the side faces of the glove box,
    wherein the engagement member is engaged at an arbitrary angle between a closing state of the glove box and the maximum rotational position during rotation to open the glove box.

2. The glove box structure according to claim 1, wherein the control member is provided on side portions of the glove box, has a convex shape extending in a transverse direction of a car body, and is engaged with the opening edge portion of the instrument panel.

3. The glove box structure according to claim 1, further comprising another inclined face provided on the engagement member for being engaged with the opening edge portion of the instrument panel during rotation to close the glove box.

4. A glove box structure comprising:
    a glove box provided in an opening formed on an instrument panel of an automobile, said glove box having side faces;
    a hinge shaft connected to said glove box and connected to said instrument panel for rotatably supporting said glove box with respect to the instrument panel;

a projection connected to said glove box for defining a maximum rotational position of said glove box relative to the instrument panel when said glove box is opened; and an stopper having an inclined face for engagement with an opening edge portion of the instrument panel, said stopper being connected to one of said side faces of said glove box, said stopper being engaged by opening edge portion of the instrument panel at an angle of opening of said glove box which is between a closed angle of said glove box and said maximum rotational position.

5. The glove box structure according to claim 4, wherein said projection is provided on one of said side faces of said glove box and extends in a transverse direction of a car body, and is engaged with said opening edge portion of the instrument panel.

6. The glove box structure according to claim 4, further comprising another inclined face provided on said engagement member for being engaged with the opening edge portion of the instrument panel during rotation to close said glove box.

7. The glove box structure according to claim 4, wherein said stopper comprises an elastic engagement member, wherein said elastic engagement member is movable to allow the opening edge portion of the instrument panel to pass by said inclined face after engagement.

* * * * *